United States Patent Office 3,076,126
Patented Jan. 29, 1963

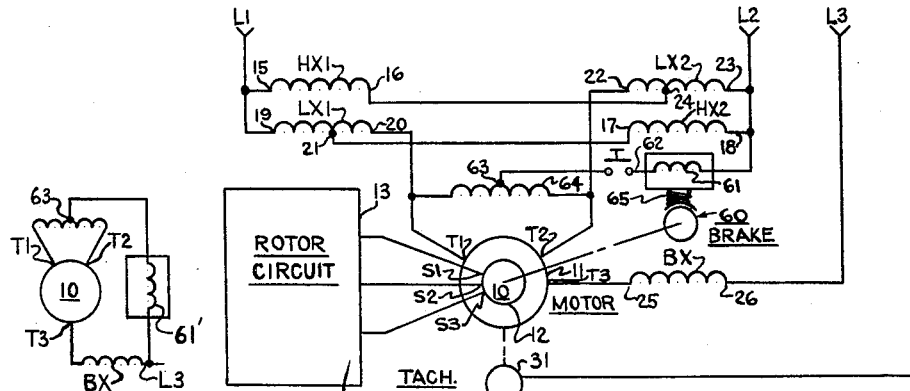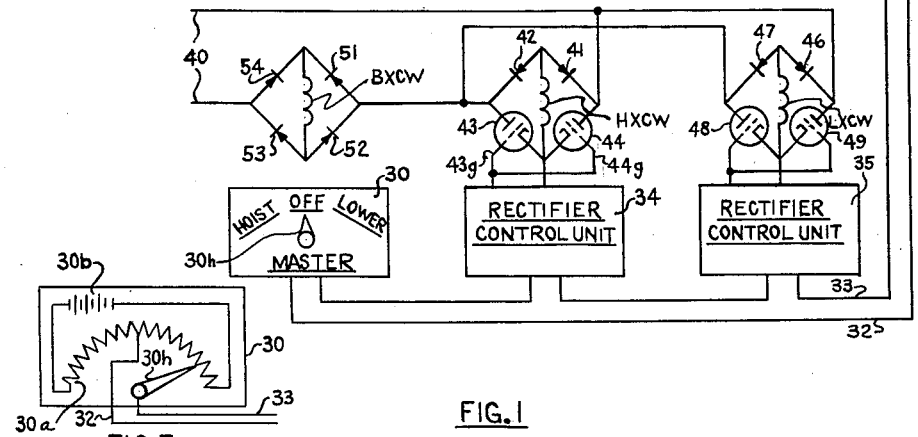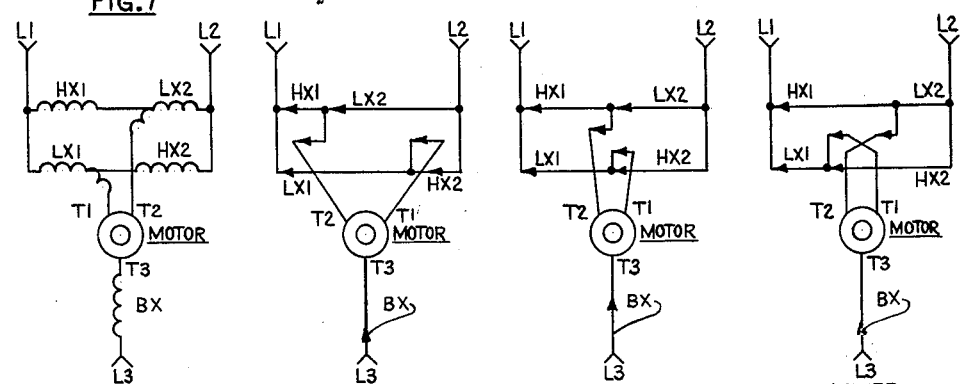

3,076,126
MOTOR CONTROL
Charles A. Schurr, Warrensville Heights, and Calvin B. Sanborn, Jr., Bedford, Ohio, assignors to Square D Company, Detroit, Mich., a corporation of Michigan
Filed Dec. 30, 1959, Ser. No. 862,842
10 Claims. (Cl. 318—207)

The invention relates to a control system for a multiphase power circuit, which system uses current restrictive devices, and more particularly to such a control system for controlling the energization of a motor and an additional electro-responsive device.

In the past, various control systems have been used for controlling the operation of three-phase induction motors and brakes associated therewith. In some of these prior systems, identical saturable magnetic devices were inserted in the three primary power leads, respectively, and these saturable magnetic devices were simultaneously equally saturated at selected degrees of saturation so as to apply balanced three-phase voltages of variable magnitude to the motor terminals to obtain the desired operation. If reversal of the direction of rotation of the motor was desired, two complete sets of identical saturable magnetic devices were used so that one set of saturable magnetic devices would control the magnitude of the three-phase voltages applied to the motor for one direction of rotation and the other set of saturable magnetic devices would control the magnitude of the voltages applied to the motor for the opposite direction of rotation. The problem of variably energizing the motor and at the same time energizing the associated brake with a constant degree of energization continuously presented itself.

Therefore, one of the objects of the present invention is to overcome the aforementioned problems encountered with the prior control systems.

Another object of the present invention is to provide a motor control system for controlling the operation of a three-phase motor wherein one means controls the phase rotation of the voltages applied to the motor terminals and wherein this means cooperates with a second means to control the magnitude of the motor terminal voltages.

Another object is to provide current restrictive devices for controlling the energization of a motor for opposite directions of phase rotation and means for compensating for the voltage drop across certain ones of the current restrictive devices so that for at least one direction of rotation the voltages applied to the motor terminals are at least as great in magnitude as the voltages of the source of power and so that the voltages applied to the motor terminals in the other direction of phase rotation are removed in magnitude from the voltages of the source of power an amount at least as great as the voltage drop across respective devices.

Another object of the present invention is to provide a circuit for connecting a brake coil into a motor circuit so that the brake coil is energized with full voltage while the motor is energized with full and also with partial voltage.

Another object of the present invention is to provide a control system for jointly and cooperatively controlling the energization of two electro-responsive devices in such manner that one of the devices is energized while the other device is adjustably energized.

A further object of the invention is to provide a circuit arrangement associated with the saturable reversing magnetic devices in a motor primary circuit which will permit continuous energization of an electromagnetic coil of a brake with full voltage as long as voltages of various magnitudes are applied to the motor.

Other objects and a fuller understanding of the present invention may be had by referring to the appended claims defining the present new, novel and useful invention or discovery, to the following description of a specific means or method contemplated by the inventor for carrying out his invention, and to the accompanying drawings in which:

FIGURE 1 is a schematic diagram of the system including a master operable to provide off, hoist or lower command signals;

FIGURE 2 is a wiring diagram of the magnetic device windings connecting the motor terminals to the power lines of FIGURE 1;

FIGURE 3 represents the magnitude of the voltages across the magnetic device windings of FIGURE 2 when the motor is energized for rotation in the hoisting direction;

FIGURE 4 represents the magnitudes of the voltages across the magnetic device windings of FIGURE 2 when the motor is not energized;

FIGURE 5 represents the magnitudes of the voltages across the magnetic device windings of FIGURE 2 when the motor is energized for rotation in the lowering direction;

FIGURE 6 illustrates the construction of one of the magnetic device units;

FIGURE 7 illustrates a master including structure for providing off, hoist and lower command signals;

FIGURE 8 illustrates a version of a rectifier control unit used in the system, and FIGURE 9 is a fragmentary and alternate brake coil energizing circuit which may be used in place of the corresponding brake energizing circuit in FIGURE 1.

The following description of the attached drawings and the accompanying claims jointly set forth one or more modifications incorporating the present invention and the advancement in the art of motor control circuits. As used throughout the present description and claims, the specific terms used to identify the parts or components have been arbitrarily chosen to indicate commercially available parts or components which may be readily obtained to carry out the specific mode of the invention as described herein, and they are to be interpreted in their broad sense wherein they include electrically or mechanically equivalent components which will provide the same functions as those mentioned herein.

In the following description, it is understood that the present illustration is for the purpose of exemplification and is not intended in any way to limit the scope of the invention either to the specific application illustrated or to the functions obtained thereby.

The individual components in the circuit are identified in the drawings either by letters or a combination of letters and numbers. It is further noted that where convenient, the letters used as reference characters to identify a component are, to some extent, an abbreviation of the function performed by the respective component in the control system.

FIGURE 1 illustrates the control circuit for controlling the speed and direction of rotation of a three-phase induction motor 10 having a stator 11 and a rotor 12. The stator 11 is provided with terminals T1, T2 and T3, which receive power from a three-phase source of voltage and current represented by supply lines L1, L2 and L3. The stator has as many stator windings as there are phases in the source of power. In this instance, the rotor 12 is a wound rotor having rotor terminals S1, S2 and S3 connected to a rotor circuit 13. Interconnected between the stator 11 and the power lines L1, L2 and L3 are three current restrictive devices which in the attached drawings are illustrated as impedance coils incorporated in individual and magnetically separated saturable magnetic devices. One of these units of the saturable magnetic devices is illustrated in more detail in FIGURE 6 for purposes of clarity since the general construction of saturable magnetic devices is well known in the art. The unit illustrated in FIGURE 6 has alternating current power windings or coils HX1 and HX2, normally of high impedance, and a direct current saturating or control winding HXCW arranged on a common magnetic core so that the magnetomotive forces resulting from the control winding HXCW affect both of the alternating current power windings HX1 and HX2. Another magnetic device unit has alternating current power windings or coils LX1 and LX2, normally of high impedance, and a direct current saturating winding LXCW, while the third magnetic device unit has only an alternating current power winding or coil BX normally of high impedance, and a direct current saturating winding BXCW. It is noted that the direct current saturating windings HXCW, LXCW, and BXCW are physically removed from each other. The impedance of each alternating current power winding is reduced in proportion to an increase in the energization of its respective direct current saturating winding.

The alternating current power winding HX1 has end taps 15 and 16; the alternating current power winding HX2 has end taps 17 and 18; alternating current power winding LX1 has end taps 19 and 20 and an intermediate tap 21; alternating current power winding LX2 has end taps 22 and 23 and an intermediate tap 24. End taps 15 and 19 of alternating current power windings HX1 and LX1, respectively, are interconnected to the power line L1 and the end taps 18 and 23 of alternating current power windings HX2 and LX2, respectively, are interconnected to the power line L2. The end tap 16 of alternating current power winding HX1 is connected to the intermediate tap 24 of the alternating current power winding LX2 and the end tap 17 of the alternating current power winding HX2 is connected to the intermediate tap 21 of the alternating current power winding LX1. The end tap 20 is connected to the terminal T1 and the end tap 22 is connected to the terminal T2. The alternating current power winding BX has one end tap 25 connected to the terminal T3 and the other end tap 26 connected to the power line L3.

Energization of the direct current saturating windings HXCW, LXCW and BXCW is in accordance with the algebraic sum and combination of a command signal and a feed back signal. The command signal is from a master 30 which defines a source of the command signal, and the feed back signal is derived from a feed back signal source, such as the direct current tachometer generator 31 driven by the motor 10.

One of the simplest structures for a master 30 is illustrated in FIGURE 7. Here the command signal is provided by a rheostat resistor 30a connected across a battery 30b in the well known manner. Polarity or direction and magnitude of the signal is provided by connecting the wire 32 to an intermediate point (off) along the rheostat resistor 30a and connecting the wire 33 to the handle 30h which contacts rheostat resistor 30a. Movement of handle 30h in opposite directions from "off" provides the hoist and lower signals respectively.

The command signal from the master 30 and the feed back signal from the tachometer generator 31 in this instance are both direct current voltage signals and therefore are easily combined by connecting the output terminals of the master 30 and the tachometer generator 31 in series electrical circuit connection. Interposed in this series connection, represented by the wires 32 and 33, are rectifier control units 34 and 35 which operate in accordance with the combined signal provided by the master 30 and the tachometer generator 31 to control energization of the direct current saturating windings HXCW and LXCW as well as winding BXCW.

The rectifier control units 34 and 35 may be similar or identical to each other so that they operate in the same manner and simultaneously receive the combination of the master and feed back signals. Since they are similar, only rectifier control unit 34 will be described in detail. As shown in FIG. 8, the rectifier control unit 34 includes an amplifier tube having a cathode 34c, a plate 34p and a grid 34g. The cathode 34c and plate 34p are connected in a plate circuit with a battery 34b and a load resistor 34r. The rectifier control unit is completed by interconnecting a grid bias resistor 33r between the grid 34g and the cathode 34c.

The direct current saturating windings BXCW, HXCW and LXCW are energized by current from a current source 40 which in this instance provides alternating current. For example, uni-directional flow of current through the direct current saturating winding HXCW is provided by connecting it as a load across a full-wave rectifier bridge circuit including rectifiers 41 and 42 and controlled rectifiers 43 and 44. The rectifiers are connected in the bridge in such manner that at any instant of time, current flows either through rectifier 43 or 44 and not through both of them simultaneously. The magnitude of current allowed to flow through the controlled rectifiers 43 and 44 is controlled by the rectifier control unit 34 by connecting the control elements 43g and 44g of controlled rectifiers 43 and 44 to the rectifier control unit 34.

If the rectifier control unit 34 as illustrated in FIGURE 8 is used, one end of load resistor 34r will be connected to the control elements or grids 43g and 44g and the other end of the load resistor 34r will be connected to the common interconnection of the rectifiers 43 and 44 and the saturating winding HXCW. Also, the grid bias resistor 33r will be interposed in series in the wire 33. With this circuit, the combination of the command signal from master 30 and the feed back signal from the tachometer generator 31 is applied to grid bias resistor 33r to affect control of the controlled rectifiers 43 and 44.

Rectifier control units 34 and 35 are similar to each other, but have the grids on their respective tubes biased in such manner that a combination signal of the master and feed back signal affects conductivity of the controlled rectifiers 43 and 44, while simultaneously preventing conductivity through the rectifiers 48 and 49, or vice versa. In this way, when the saturating winding HXCW is energized to any degree of energization, the saturating winding LXCW is completely free of energization, or vice versa.

As further illustrated, these rectifier bridges containing the direct current saturating windings HXCW and LXCW respectively, are connected in parallel and this parallel connection is connected in series with the direct current saturating winding BXCW. The combination series and parallel arrangement is then connected across the current source 40. Uni-directional flow of current through the direct current saturating winding BXCW is obtained by connecting it as the load in a full-wave bridge rectifier containing rectifiers 51 and 52 and 53 and 54. It is noted that whenever current flows through either the direct current saturating winding HXCW or the direct current saturating winding LXCW, that same current flows through the direct current saturating winding BXCW so that the magnitude of current flowing through the alternating current power winding BX is controlled simultaneously with the controlling of the magnitude of current flowing through either alternating current power windings HX1 and HX2 or the magnitude of current flowing through alternating current power windings LX1 and LX2.

One of the applications of the present motor control circuit is in hoists wherein the motor 10 is to hoist a load or to control the lowering of the load. When the motor is used in this application, a spring set electromagnetically released brake is usually applied to the driving structure, or mechanically coupled to the rotor of the motor. FIGURE 1 schematically illustrates such a brake 60 as having an energizable release coil 61 connected preferably in series with a safety switch 62 and between one of the supply lines and an intermediate tap 63 on a voltage divider 64 interconnected between the terminals T1 and T2. In FIGURE 1, the brake coil 61 is connected between tap 63 and point 18 or supply line L2, whereas in the alternate circuit of FIGURE 9, the brake coil 61 is connected between the supply line L3 and center tap 63. Brakes of this type are commonly used in the industry and have a spring 65 which normally sets the brake to prevent rotation of the rotor. Energization of the coil 61 overcomes the bias of spring 65 to permit rotation of the rotor. It has been found that with this circuit arrangement, the energizable release coil 61 is energized whenever the switch 62 is closed and power is applied to the motor terminals T1 and T2.

The magnitude of the current to these terminals T1 and T2 has no effect on the magnitude of the voltage impressed across the coil 61. The voltage across the coil 61 is approximately one-half the voltage across phase L1–L2 when connected as in FIGURE 1. Although the safety switch 62 has been illustrated as a push button for purposes of clarity, it is understood that it can be interlocked with the operating handle 30h of the master 30 in any manner commonly used in the art. When the safety switch 62 is used, it must be held down and closed to permit energization of coil 61 and release of the brake to operate the hoist by moving operating handle 30h in any of its hoist and lower positions wherein the master 30 provides the desired hoist or lower command signal.

*Operation*

With the initial movement of the master and particularly handle 30h in the hoist direction, the master switch produces a direct current command signal which is fed into the rectifier control unit 34 and the rectifier control unit 35. This direct current signal turns on the hoist rectifier control unit 34 and leaves off the lower rectifier control unit 35. The turning on of the hoist rectifier control unit 34 allows the controlled rectifiers 43 and 44 in the rectifier bridge circuit to supply direct current to the direct current saturating winding HXCW. At this time, no current flows through direct current saturating winding LXCW or through power windings LX1 and LX2 because rectifier control unit 35 has not been turned on. The tachometer generator 31 produces no feed back signal because the hoist has not started to move.

Current is now conducted from the alternating current supply 40 through the bridge rectifier energizing the direct current saturating winding HXCW and the bridge rectifier energizing the direct current saturating winding BXCW. The direct current flowing through direct current saturating windings HXCW and BXCW partially saturates the respective saturable reactor units, reducing the impedance of the respective alternating current windings HX1, HX2 and BX. With the saturation or lowering of the impedance of alternating current windings HX1, HX2 and BX, the voltage potential at the terminal T1 approaches the voltage potential at the supply line L2, the voltage potential at the terminal T2 approaches the voltage potential at supply line L1, the voltage potential at the terminal T3 approaches the voltage potential at the supply line L3. This is shown in FIGURE 3 wherein the arrows represent voltage drops or voltage differences across their respective alternating current power windings HX1, HX2, LX1, LX2 and BX. As the impedances of alternating current power windings HX1, HX2 and BX approach zero, the voltages across the terminals T1, T2 and T3 approach the same voltages as the respective line voltages L1, L2 and L3. Adjustment of the impedance of the windings adjusts the terminal voltage and thereby the speed of the motor.

As shown in FIGURES 1 and 2, the end tap 16 of the alternating current power winding HX1 is fastened to the intermediate tap 24 of the alternating current power winding LX2 and the end tap 17 of the alternating current power winding HX2 is fastened to the intermediate tap 21 of the alternating current power winding LX1. Because of this, the alternating current power windings LX1 and LX2 operate as autotransformers to produce voltages in their overhanging sections, i.e. between the intermediate tap 21 and the end tap 20 and the end tap 22 and the intermediate tap 24 respectively. The voltages added by the overhanging windings replace at least a portion of the voltage drops across the alternating current power windings HX1 or HX2 due to impedance inherent in the windings which cannot be overcome by the winding HXCW. In this way, the terminal voltages may be made substantially equal to the line voltages during hoisting with full load and when the master is commanding full speed hoist.

When the load starts to move in the hoist direction, the tachometer generator 31, which is mechanically coupled to the motor shaft, starts to produce a feed back voltage signal which is proportional to the speed of the motor 10. This feed back signal from the tachometer generator 31 opposes the direct current output voltage signal from the master switch 30, and the combination controls the hoist and lower rectifier control units 34 and 35. Since the motor is moving in the hoist direction, these command and feed back signals will keep the lower rectifier control unit 35 effectively turned off. At the same time, the hoist rectifier control unit 34 output is reduced to a point at which the current flowing through the direct current saturating winding HXCW causes the voltage applied to the motor terminals to establish a motor torque sufficient to hoist the load at the speed determined by the master switch 30. The speed of the motor stabilizes when the signals from the master switch 30 and the tachometer generator 31 effectively combine to indicate to the rectifier control units that the motor is operating at the desired speed and in the desired direction.

The hoist is now lifting the load at the speed selected by the setting of the master 30. Adjusting the master 30, but keeping it in the hoist range, will cause the motor to run at any one of an infinite number of stable hoisting speeds. The motor operates at the various speeds because the various voltages applied to the motor terminals may be varied from zero to the voltages of the power lines L1, L2 and L3. With the line voltages all applied to the motor terminals, the motor will run at a maximum obtainable speed in accordance with the weight of the load. Light loads can be lifted at a faster maximum speed than heavy loads.

If, while hoisting at full speed, the control handle 30h is moved suddenly to a slower speed point, the command signal from the master 30 is suddenly reduced but the tachometer generator feed back signal is momentarily maintained at the existing higher signal voltage until the rotor slows down. Because of this, the effective or resultant signal to the lowering rectifier control unit 35 and the hoisting rectifier control unit 34 is suddenly reversed in polarity. This causes a turning off of the hoisting rectifier control unit 34 and a turning on of the lowering rectifier control unit 35, and thereby a reversing of the phase rotation of the voltages applied to the terminals of the motor. The motor starts to slow the load down until such time as the tachometer generator feed back voltage signal has been reduced to a magnitude whereby the command signal is again greater than the tachometer generator voltage signal. As soon as this happens, the hoist rectifier control unit 34 is again turned on and the lowering rectifier control unit 35 is turned off so that hoisting voltages are again applied to the motor.

Regardless of the weight of the load, the master switch 30 can be placed in such a position as to hold the load still. This floating of the load is accomplished by reducing the command signal from the master 30 to a magnitude wherein the voltage applied to the motor and the torque of the motor are maintained at values wherein the motor hoisting torque exactly equals the downward pull of the load. At this time, the tachometer generator 31 produces no output signal voltage and the hoist rectifier control unit responds to the command signal output of the master 30. To obtain the exact standstill or float point, the master 30 is manually controlled until the command signal from it is just sufficient to cause the motor to stand still and provide a torque which overcomes the downward pull of the load.

If the operator manually moves the master 30 towards off a little bit too far, the load will start to lower because the command signal is not large enough to energize the direct current saturating winding HXCW sufficient to maintain sufficient saturation in the alternating current power windings HX1 and HX2 to supply enough voltage and current to the motor in the hoisting direction and thus not sufficient torque to hold the load. In such a case, the load will tend to slowly go down because the pull of the load is greater than the hoisting torque produced by the motor.

Movement of the handle 30h of the master 30 in the lowering direction provides the direct voltage command signal of opposite polarity from that which the master produced in the hoist direction. When this lowering command signal is fed into the hoist rectifier control unit 34 and the lower rectifier control unit 35, the hoist rectifier control unit 34 is turned off and the lower rectifier control unit 35 is turned on. Thus with the turning on of the lower rectifier control unit 35, the controlled rectifiers 48 and 49 in the bridge circuit supplying direct current saturating winding LXCW saturates the reactor unit which lowers the impedance of alternating current power windings LX1 and LX2. Because the direct current saturating winding HXCW is not now energized, alternating current power windings HX1 and HX2 have a high impedance. The reduction of the impedance of the alternating current power windings LX1 and LX2 causes the potential of terminal T1 to approach the potential of supply line L1 and the potential of terminal T2 to approach the potential of supply line L2 as shown in FIGURE 5. The direction of phase rotation of the voltages applied to the terminals for lowering is thereby opposite those applied for hoisting. Thus voltage is now supplied to the motor across the terminals T1—T2 and the terminals T1—T3 and the terminals T2—T3 due to the saturation of alternating current power windings LX1, LX2 and BX in a manner similar to that as previously described for the hoisting direction. With this voltage being supplied to the motor, the motor will now produce a torque in the down direction which drives the load downward until the tachometer generator 31 feed back signal is great enough that it will actually be larger than the master 30 command signal voltage. When this happens, the lowering rectifier control unit 35 is turned off and the hoist rectifier control unit 34 is turned on. At the instant the feed back signal becomes greater than the master or command signal, this shutting off of the lower rectifier control unit 35 and turning on of the hoist rectifier control unit 34 takes place. While the tachometer generator feed back signal is increasing, and before it becomes equal to the master 30 command signal, the output of the lowering rectifier control unit 35 is reduced gradually and therefore the impedances of the alternating current power windings LX1 and LX2 are increased to reduce the voltage to the motor.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A control having a three phase power circuit including three power lines defining a three phase source, a set of forward current restrictive devices arranged at least one device in each of two of the lines, a set of at least two reversing current restrictive devices across said two of the lines, one of the reversing devices being connected to one of the two lines through an intermediate tap on the forward device of that one of the two lines, the other being connected to the other of the two lines through an intermediate tap on the forward device of the said other of the two lines, and means controlling the degree of conductivity of all of said devices so that the conductivity of one set is adjustable when the restrictivity of the other set is at maximum.

2. A control according to claim 1 further including a voltage divider connected across two of said lines at the load side of the devices of said two lines, an electromagnetic mechanism including an energizable device, and circuit means connecting the energizable device between the voltage divider and one of said lines at the power side.

3. The structure as defined in claim 1 additionally including the feature wherein said current restrictive devices are impedance coils.

4. The structure as defined in claim 1 additionally including the feature wherein said current restrictive devices are impedance coils and core means therefor, and said core means includes a core common to said forward impedance coils.

5. The structure as defined in claim 1 additionally including a third current restrictive device arranged in the third one of the lines, and wherein said current restrictive devices are impedance coils and core means therefor, and said core means includes a core common to said forward impedance coils, and includes an additional separate core for the third coil.

6. A circuit for controlling the coordinated energization of a multi-phase electric motor having motor terminals and an inter-related brake having an energizable coil from power lines defining a multi-phase source of power, said circuit comprising a voltage divider connected between two terminals of said motor and provided with a mid tap, circuit means connecting said energizable coil between one of said power lines and said mid tap, and adjustable current restrictive means connected between said two motor terminals and two of said power lines and operative to adjust the voltage at said two terminals.

7. A circuit for controlling the coordinated energization of a multi-phase electric motor having motor terminals and an inter-related brake having an energizable coil from power lines defining a multi-phase source of power, said circuit comprising a voltage divider connected between two terminals of said motor, circuit means connecting said energizable coil between one of said power lines and said voltage divider, and adjustable current restrictive means connected between said two motor terminals and two of said power lines and operative to adjust the voltage at said two terminals.

8. A control having three-phase power circuits including three power lines defining a three-phase source, a set of forward current restrictive devices arranged one in each of two of the lines, a set of reversing current restrictive devices connected across said two of the lines, an additional current restrictive device in the third line, means for controlling the conductivities of all of said devices so that the conductivities of one set of devices and of said additional current restrictive device are adjustable when the restrictiveness of the other set is at maximum, a voltage divider connected across two of said lines at the load side of the devices of said two lines, an electromagnetic mechanism including an energizable device, and circuit means connecting the energizable device between the voltage divider and one of said lines at the power side of said lines.

9. A motor control system for controlling, by a three-phase source of power having power lines, the energization of a three-phase motor having terminals, said control system comprising a first saturable magnetic means controlling the magnitude and phase direction of two of the three-phase currents applied to the motor, second saturable magnetic means controlling the magnitude of the other phase current applied to the motor, and compensating means cooperating with at least one of said saturable magnetic means to compensate for voltage drop resulting from current flow in said one of said saturable magnetic means so that at least one of the voltages between two terminals of the motor is of a magnitude more nearly approximating the magnitude of any one of the line voltages of the source of power.

10. A system according to claim 9 wherein the first saturable magnetic means includes a winding, and the compensating means includes an intermediate tap on said winding.

References Cited in the file of this patent

UNITED STATES PATENTS

| | | |
|---|---|---|
| 2,734,157 | McKenney et al. | Feb. 7, 1956 |
| 2,918,614 | De Westfelt | Dec. 22, 1959 |